United States Patent Office 2,745,764
Patented May 15, 1956

2,745,764

PROCESS OF PRECIPITATING SUBSTANTIALLY ANHYDROUS CALCIUM CHROMATE AND PRODUCT RESULTING THEREFROM

Holbert E. Dunn, Crafton, and Ellis J. O'Brien, Pittsburgh, Pa., assignors to Vanadium Corporation of America, New York, N. Y., a corporation of Delaware No Drawing. Application March 4, 1953,
Serial No. 340,403

11 Claims. (Cl. 106—302)

This invention relates to a process of precipitating substantially anhydrous calcium chromate from sodium chromate solutions and to the product resulting therefrom. The sodium chromate solutions may result from roasting and/or leaching chrome ores, slags, pulverized ferro-chromium or other chromium bearing materials. The process relates more particularly to improvements in the precipitation of substantially anhydrous calcium chromate by treating sodium chromate solutions with calcium chloride.

According to a known process, a calcium chloride solution is added to a sodium chromate solution and the mixed solution is heated to precipitate calcium chromate. The reaction may be represented by the following equation:

(1) $Na_2CrO_4 + CaCl_2 = 2NaCl + CaCrO_4$

When the reaction is carried out at atmospheric pressure, and completed at a pH of about 6.5–7.0, the product obtained is in the form of the dihydrate $CaCrO_4.2H_2O$ comprising 81.25% $CaCrO_4$ and 18.75% $H_2O$, in yellow monoclinic prismatic or rhombic crystal form. The dihydrate is soluble in water to the extent of 14.0 to 20.3 grams per 100 grams of water at 20° C. Because of its solubility and high water content, this chromate is not suitable for direct application in ceramic and paint pigments or as a pyrometallurgical oxidant.

Calcium chromate monohydrate $CaCrO_4.H_2O$ can be made by mixing a sodium chromate solution containing, say, 75.5 grams per liter chromium with calcium chloride to the extent of an excess of 20 to 50% of theoretical requirements, and heating the mixed solution to boiling. The product is in rhombic crystalline form containing 90.3% calcium chromate and 9.7% $H_2O$, which corresponds closely to the monohydrate $CaCrO_4.H_2O$. However, only about 61% of the chromium content can be precipitated by this method in which the reaction is carried out and completed at a pH of about 6.5 to 7.0.

The present invention provides various improvements in the processes and products heretofore known.

The calcium chromate product produced in accordance with this invention is substantially anhydrous and has a low bulking density. It is in the form of an intimate mixture of slender needle-like or rod-form calcium chromate crystals, usually of a size order of 5 to 15 microns in diameter by 50 to 150 microns in length, and a smaller amount (usually 2.5 to 6%) of separate, discrete, amorphous, milky particles of a sodium aluminosilicate gel such as albite feldspar having the composition $$Na_2O.Al_2O_3.6SiO_2$$

or lime-soda feldspar, namely, a combination of this albite with anorthite, $2(CaO.Al_2O_3.2SiO_2)$. These feldspathic compositions act as crystal-shaping catalyst or nuclei to insure the formation of the calcium chromate precipitate in the needle-like or rod-form crystals. These rod or needle-form crystals have high crushing resistance and are highly inert to rehydration and even to calcination at 1000–1200° F. The substantially anhydrous calcium chromate product has a low bulking density of 9 to 45 pounds per cubic foot, as compared to 50 to 55 pounds per cubic foot for atmospheric precipitated crypto-crystalline or rhombic dipyramidal material made according to prior known processes. Our product also is to be contrasted with calcium chromate produced by autoclaving at 3 atmospheres pressure which has a bulking density of 87 pounds per cubic foot and is of the rhombic dipyramidal form. The absolute specific gravity of the individual crystals of our calcium chromate product is from 2.90 to 3.10. This calcium chromate product having only ⅓ to ⅙ the bulking density of prior known precipitated calcium chromate, may be distinguished as a "light" grade, as contrasted to the regular "dense" variety.

Our process may be carried out in the following manner, the quantities being by weight unless otherwise specifically stated.

Step 1.—Sodium silicate solution is added to a sodium chromate solution. The sodium silicate solution is added slowly so as to prevent hydrolysis of the sodium silicate to free silicic acid, which would not react with the sodium aluminate next added to form sodium alumino-silicate crystal-shaping catalyst, but would appear on the surface of the slurry as a gummy scum. The sodium chromate solution containing sodium silicate is hereinafter referred to as "Solution 1."

Step 2.—A solution of aluminum sulphate and caustic soda (or its equivalent, sodium aluminate), hereinafter referred to as "Solution 2," is then added to Solution 1. The resulting slurry is maintained at a temperature of 70–190° F. and at a pH of 7.2–12 during a conditioning period for a time sufficient to form nuclei of sodium aluminosilicate. This conditioning period will vary according to the temperature of the slurry. The object of the conditioning period is to form nuclei of sodium aluminosilicate from the sodium silicate and sodium aluminate. If the slurry is at a temperature of 70° F., this conditioning period may require about 15 minutes. If it is at a temperature of 120° F., it may require 10 minutes; if at a temperature of 160° F., a period of 5 minutes; and if at a temperature of 190° F., a period of 2 to 3 minutes. The pH of the slurry during this conditioning period must be at least 7.2 and may be as high as 12.0, the preferred pH being 7.4–8.2, and the preferred temperature being 120–190° F.

When Solution 2 is added to Solution 1, the cloudiness first increases and then decreases during the conditioning period. The decrease in cloudiness during the conditioning period indicates the formation of sodium aluminosilicate nuclei, but the solution still remains cloudy during the conditioning period. The reaction for forming the sodium aluminosilicate nuclei is represented by Equation 2 as follows:

Albite feldspar
(2) $3Na_2SiO_3 + 2Al_2(SO_4)_3 + 10NaOH = 2(Na_2O.Al_2O_3.6SiO_2) + 6Na_2SO_4 + 5H_2O$ Step 3.—After the nuclei of sodium aluminosilicate have formed during the conditioning period, a solution of calcium chloride is mixed with the sodium chromate solution, the calcium chloride amounting to at least 120% of the stoichiometric requirements of calcium chloride for precipitating all of the chromium as calcium chromate. The calcium chloride solution is preheated to a temperature of 120–190° F. before it is mixed with the sodium chromate solution, the preferred temperature of mixing these solutions being about 160° F. The addition of the preheated calcium chloride solution to the sodium chromate solution causes precipitation of a large proportion of the chromium as calcium chromate, the reaction being represented by Equation 1.

If the solutions are mixed at temperature higher than about 190° F., the rate of calcium chromate precipitation is so rapid that the slurry becomes so thick that agitation of it becomes difficult. Also the absorption of NaCl in the calcium chromate product increases rapidly at temperatures above 190° F., requiring increased water washing of the precipitate and increasing the chromium loss in the wash water in order to control chloride content in the product to the desired 0.50% maximum. High temperatures of mixing the calcium chloride solution with the sodium chromate solution produce small crystals, whereas low temperatures produce large crystals. The precipitation of large crystals has less tendency to occlude or absorb impurities such as sodium and/or calcium chlorides. If the calcium chloride solution is mixed with the sodium chromate solution at a temperature below about 120° F., the precipitation is so slow as to be economically unfeasible.

If the calcium chloride solution is mixed with the sodium chromate solution at a temperature of about 160° F., precipitation of approximately 80% of the chromium content as calcium chromate occurs in about 1 minute.

The reaction of sodium silicate, aluminum sulphate and sodium hydroxide to form sodium aluminosilicate, as represented by Equation 2, is sluggish. Likewise, the reaction of sodium silicate with sodium aluminate to form sodium aluminosilicate, is sluggish. The formation of calcium chromate from sodium chromate and calcium chloride, as represented by Equation 1, is very rapid. Accordingly, it is necessary to employ the conditioning period for forming the nuclei of sodium aluminosilicate prior to the addition of the calcium chloride solution to the sodium chromate solution. When this conditioning period is employed, precipitation of amorphous albite feldspar gel occurs according to Reaction 2 to insure the formation of the calcium chromate precipitate in the needle-like or rod-form crystals which are characteristic of the low bulking density calcium chromate product.

Step 4.—The slurry is then heated to a higher temperature in the neighborhood of the boiling point, which is about 215° F. Preferably the heating is carried out at a temperature of about 210–215° F. During precipitation of the calcium chromate, the pH of the slurry becomes lower. Samples of the slurry are analyzed from time to time and if its pH falls below 8.2, it is adjusted to this value by adding caustic soda solution and then heating is continued until precipitation is completed.

Step 5.—Thereafter the slurry is separated, for example, by filtration, and then is washed and dried.

In place of using a calcium chloride solution, we may use calcium chloride in solid form.

The following are specific examples of the manner in which our invention may be carried out.

Example 1

In this example we started with commercial grade sodium bichromate crystals, $Na_2Cr_2O_7.2H_2O$, and made a sodium chromate solution from it by adding caustic soda. This sodium bichromate was dehydrated so that it contained 37.85% chromium.

205 kgs. of anhydrous sodium bichromate containing 37.85% Cr were dissolved in 800 liters of water at 70° F. to give a concentration of 86.4 grams per liter chromium. This solution had a pH of about 4.5.

55 kgs. of caustic soda flake (76% $Na_2O$) were added to the sodium bichromate solution and then 8 kgs. of caustic soda in the form of a 10% NaOH solution, were added to insure complete conversion of the bichromate to monochromate $NaCrO_4$, as indicated by orange to yellow color change. The pH of the adjusted solution was 7.8.

The solution was heated to 120° F. and 34.5 kgs. of 40° Baumé sodium silicate (28.8% $SiO_2$ by weight) were added slowly to the solution. After about 75% of the sodium silicate had been added, the solution became cloudy. The sodium chromate solution containing sodium silicate is hereafter referred to as "Solution 1."

10 kgs. of aluminum sulphate, $Al_2(SO_4)_3.18H_2O$, technical grade, and 10 kgs. caustic soda flake (76% $Na_2O$) were dissolved in water, and the solution diluted in 200 liters with water. This formed sodium aluminate containing excess caustic soda. This solution is hereinafter referred to as "Solution 2."

A solution was made of:
340 kgs. calcium chloride, technical grade, 74–77% $CaCl_2$, 1000 liters water.

This solution is referred to hereinafter as "Solution 3."

Solution 2 was added to Solution 1 with agitation, resulting in a pH of 11.2 and a temperature of about 120° F.

Heat was then applied to bring the cloudy solution to 160° F. in about 5 minutes, this step being the conditioning period for forming nuclei of sodium aluminosilicate.

Solution 3 was heated to 160° F. and, while stirring, it was added to the mixture of Solutions 1 and 2 in a period of about 1 minute, causing the precipitation of approximately 80% of the chromium content as calcium chromate in that period. This addition of the calcium chloride solution lowered the pH of the slurry to about 8.7.

The slurry was then heated to 210–215° F. in a period of 20 minutes and maintained at that temperature for 15 minutes.

The hot slurry was filtered on a suction filter to give a cake of 70% moisture, which was then washed with 2½ displacement washes with hot water (160° F.) to give 867.3 kgs. of wet filter cake at 70% moisture, or 358 kgs. when dried to 27% moisture, ordinarily found desirable for incorporating the calcium chromate product with other briquetting aggregates. The recovery of chromium in the product amounted to 94%. A sample of the product dried at 230° F. to equilibrium moisture content had a bulking density of 13.95 pounds per cubic foot and analyzed as follows:

85.89% $CaCrO_4$
2.88% $SiO_2$
0.77% $Al_2O_3$
0.22% Cl $$\text{Ratio } \frac{SiO_2}{Al_2O_3} = \frac{3.74}{1}$$

In filtering the precipitated slurry, 1385 liters of strong filtrate containing 0.85 kg. of chromium, and 1538 liters of weak wash filtrate containing 4.34 kgs. of chromium, were recovered. The strong filtrate was discarded primarily because of its low chromium concentration, but the weak wash filtrate could be reused in solution make-up instead of water. This practice would permit 2 to 4.5% additional chromium recovery.

Micro-examination of this calcium chromate product showed it to be a mixture of crystalline, needle-form calcium chromate and separate, discrete, amorphous, milky particles of sodium aluminosilicate gel. The product does not have good bonding power when it is briquetted by itself or used in a briquetting mix with other non-binding aggregates. However, we have found that the bonding power of the calcium chromate product can be improved by adding a gel hardener such as sodium or potassium dichromate or sodium chloride at the time the calcium chromate product is incorporated in the briquetting mix, or simply by permitting say 1% or less sodium chloride to remain residual in the final calcium chromate product by limiting the amount of water washing accordingly.

In order to produce a calcium chromate product having low content of calcium carbonate, caustic soda low in CO$_2$ should be used so that there will not be much CO$_2$ available for reacting with the calcium chloride.

Example 2

Sodium chromate liquor was obtained by water-leaching a soda-lime roasted chrome ore, at a pulp density of 42.4% solids by weight, the sodium chromate liquor having a pH of 11.7 and analyzing:

74.00 grams/liter chromium
0.12 gram/liter SiO$_2$
1.56 grams/liter Al$_2$O$_3$ 910 liters of this solution was heated to 80° F. and 80 liters of 1:1 hydrochloric acid (40 liters of 38% HCl plus water to 80 liters) was added to give a pH of 6.9 and a heavy gelatinous precipitate. After boiling for 3 minutes this precipitate was filtered off and discarded. The pH was then adjusted to 8.0 by the addiiton of 10 kgs. of flake caustic soda and then readjusted to 7.6 by addition of 3 liters of 1:1 hydrochloric acid.

This solution was then heated to 120° F. and 29.95 kgs. of 40° Bé. sodium silicate (28.8% SiO$_2$ by weight) was added slowly to give Solution 1.

173 liters of sodium aluminate (Solution 2) was then added to Solution 1, with agitation for a conditioning period of 10 minutes. Heat was then applied to bring the cloudy solution to 160° F. in about 5 minutes, whereupon Solution 3 (295 kgs. of calcium chloride in 1000 liters of water) preheated to 160° F., was added to the mixture of Solutions 1 and 2, while stirring, in a period of about 1 minute. Then heating was continued with stirring to 210° F. in 25 minutes, holding for 15 minutes longer at temperature, with the pH of the slurry showing 8.9 upon reaching 210° F. The slurry was then filtered and washed to obtain a recovery efficiency of 87.6% of the total chromium and a pH of the filtrate of 8.2. The recovered product, dried at 230° F., analyzed as follows:

84.18% CaCrO$_4$=28.06% Cr
4.29% SiO$_2$
0.90% Al$_2$O$_3$
0.27% Na$_2$O
0.01% Cl
2.00% ignition loss at 1000° F.

Micro-examination showed the product to consist of a mixture of fine granular dipyramidal and coarse prismatic needles of yellow calcium chromate with fine granular discrete grains of milky white binder.

The product had a bulking density of 34.3 pounds per cubic foot.

Example 3

Sodium chromate liquor was obtained by leaching a 1650° F. roast of ground ferrochromium with lime and salt in 20% sodium carbonate solution at a pulp density of 22.3 % solids, to give a sodium chromate liquor at a pH of 11.6, analyzing:

75.94 grams/liter chromium
0.30 gram/liter SiO$_2$
0.34 gram/liter Al$_2$O$_3$ 820 liters of this solution was heated to 74° F. and 75 liters of 1:1 hydrochloric acid was added to give a pH of 6.9 and a very light flocculent precipitate, which was not removed.

The pH was then readjusted to 7.7 by the addition of 7.0 kgs. of flake caustic soda, and heated to 120° F., whereupon 27.6 kgs. of 40° Bé. sodium silicate was added slowly to give Solution 1.

161 liters of sodium aluminate (Solution 2) was then added to Solution 1 with agitation for a conditioning period of 10 minutes.

The cloudy mixture of Solutions 1 and 2 was heated with agitation to 160° F. in about 5 minutes, and Solution 3 (273 kgs. of calcium chloride in 900 liters of water) previously heated to 160° F., was added to the mixture of Solutions 1 and 2, while stirring, in a period of about 1 minute, and heating was continued with stirring to 210° F. in 20 minutes, holding 15 minutes longer at temperature. The slurry had a pH of 8.8 upon reaching 210° F.

The slurry was filtered and washed to obtain a recovery efficiency of 86.6% of the total chromium, and a pH of the filtrate of 8.2. The recovered product, dried at 230° F., analyzed as follows:

81.57% CaCrO$_4$=27.19% Cr
4.10% SiO$_2$
0.87% Al$_2$O$_3$
0.30% Na$_2$O
0.01% Cl
4.00% ignition loss at 1000° F.

Micro-examination showed the product to consist of a mixture of fine granular dipyramidal and coarse prismatic needles of yellow calcium chromate with discrete grains and transparent needle crystals of colorless binder.

The product had a bulking density of 40.0 pounds per cubic foot.

In carrying out our invention, it is preferred that the feldspathic crystal shaping catalyst constitute from 2.5 to 6.5% by weight of the calcium chromate product. In general, the SiO$_2$ content should be between 2.3% and 4.5% and the Al$_2$O$_3$ content should be between 0.65% and 1.2% of the calcium chromate product.

This application is related to our copending applications Serial Nos. 340,401, 340,402 and 340,404, all filed March 4, 1953.

The invention is not limited to the preferred embodiment but may be otherwise embodied or practiced within the scope of the following claims.

We claim:

1. The process of precipitating a substantially anhydrous calcium chromate product, which comprises adding sodium silicate solution to a sodium chromate solution, adding sodium aluminate solution to the sodium chromate solution, maintaining the slurry at a temperature of 70–190° F. during a conditioning period for a time sufficient to form nuclei of sodium aluminosilicate and at a pH of 7.2–12, adding calcium chloride in an amount of at least 120% of the stoichiometric requirements of calcium chloride for precipitating calcium chromate, and heating the resulting slurry to a temperature of 200–215° F. to precipitate a mixture of substantially anhydrous calcium chromate and sodium aluminosilicate gel.

2. A process according to claim 1, wherein the slurry is maintained during the conditioning period at a pH between 7.4 and 8.2.

3. A process according to claim 1, wherein the slurry is maintained during the conditioning period at a temperature between 120 and 190° F.

4. A process according to claim 1, wherein the slurry is maintained during the conditioning period at a pH between 7.4 and 8.2 and at a temperature between 120 and 190° F.

5. The process of precipitating a substantially anhydrous calcium chromate product, which comprises adding sodium silicate solution to a sodium chromate solution, adding sodium aluminate solution to the sodium chromate solution, maintaining the slurry at a temperature of 70–190° F. during a conditioning period of at least 2 minutes to form nuclei of sodium aluminosilicate and at a pH of 7.2–12.0, adding calcium chloride in an amount of at least 120% of the stoichiometric requirements of calcium chloride for precipitating calcium chromate, and heating the resulting slurry to a temperature of 200–215° F. to precipitate a mixture of substantially anhydrous calcium chromate and sodium aluminosilicate gel.

6. The process of precipitating a substantially anhydrous calcium chromate product, which comprises adding sodium silicate solution to a sodium chromate solution, adding sodium aluminate solution to the sodium chromate solution, maintaining the slurry at a temperature of 70–190° F. during a conditioning period for a time sufficient to form nuclei of sodium aluminosilicate and at a pH of 7.2–12.0, adding a calcium chloride solution in an amount of at least 120% of the stoichiometric requirements of calcium chloride for precipitating calcium chromate, and heating the resulting slurry to a temperature of 200–215° F. to precipitate a mixture of substantially anhydrous calcium chromate and sodium aluminosilicate gel.

7. A process according to claim 6, wherein the calcium chloride solution is at a temperature of 120–190° F. when it is added to the sodium chromate solution.

8. In a process of precipitating a calcium chromate product by mixing calcium chloride with a solution of sodium chromate and heating the solution, the improvement for preparing the sodium chromate solution in order to precipitate, when calcium chloride is added to it and the solution is heated, a substantially anhydrous calcium chromate product of low bulking density which is a mixture of crystalline, needle-form calcium chromate and separate, discrete, amorphous, milky particles of sodium aluminosilicate gel, which improvement comprises adding sodium silicate solution and sodium aluminate solution to the sodium chromate solution, and maintaining the solution at a temperature of 70–190° F. and at a pH of 7.2–12.0 during a conditioning period for a time sufficient to form nuclei of sodium aluminosilicate.

9. A process according to claim 8, wherein the sodium silicate solution and sodium aluminate solution are in amounts to give 2.3–4.5% $SiO_2$ and 0.65–1.2% $Al_2O_3$ by weight in the final precipitated calcium chromate product.

10. A substantially anhydrous calcium chromate product having a bulking density of 9 to 45 pounds per cubic foot, and being an intimate mixture of crystalline, needle-form calcium chromate and separate, discrete, amorphous, milky particles of sodium aluminosilicate gel.

11. A calcium chromate product according to claim 10, wherein the sodium aluminosilicate gel is of the approximate molecular formula $Na_2O.Al_2O_3.6SiO_2$ and amounts to 2.5–6.5% by weight of the calcium chromate product.

References Cited in the file of this patent

UNITED STATES PATENTS

| | | |
|---|---|---|
| 1,660,696 | Wallin | Feb. 28, 1928 |
| 2,276,314 | Kirk | Mar. 17, 1942 |
| 2,276,315 | Kirk | Mar. 17, 1942 |
| 2,395,472 | Fernald | Feb. 26, 1946 |
| 2,493,789 | Udy | Jan. 10, 1950 |

OTHER REFERENCES

Chemical Process Industries (Shreve); pub. by McGraw-Hill Book Co., Inc., N. Y., N. Y. (1945); page 498 is relied upon.

Barrer et al.: "J. of Chem. Society," May 1952, pp. 1516–71.